United States Patent
Saunders

(10) Patent No.: US 8,490,928 B2
(45) Date of Patent: Jul. 23, 2013

(54) GROMMET

(75) Inventor: Robert Howard Saunders, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 12/824,742

(22) Filed: Jun. 28, 2010

(65) Prior Publication Data

US 2011/0314633 A1  Dec. 29, 2011

(51) Int. Cl.
*F16L 5/00*  (2006.01)

(52) U.S. Cl.
USPC ............. 248/56; 248/62; 248/71; 248/230.8; 248/230.7; 248/231.81; 248/230.9; 411/510

(58) Field of Classification Search
USPC ............. 248/56, 60, 62, 68.1, 69, 71, 74.1, 248/74.3, 230.8, 230.7, 231.81, 230.9; 174/152 G, 153 G, 151; 16/2.1, 2.2; 439/604, 439/587, 274, 275; 277/606; 411/352, 439, 411/500, 516, 510; 24/458
See application file for complete search history.

(56) References Cited

U.S. PATENT DOCUMENTS

| | | | | |
|---|---|---|---|---|
| 1,921,797 A * | 8/1933 | Armie | | 248/69 |
| 2,969,216 A * | 1/1961 | Hallsey | | 248/71 |
| 3,199,816 A * | 8/1965 | Weisz | | 248/71 |
| 3,580,988 A * | 5/1971 | Orlowski et al. | | 174/153 G |
| 3,815,855 A * | 6/1974 | Appleton | | 248/74.3 |
| 4,509,710 A * | 4/1985 | Cooper et al. | | 248/73 |
| 4,603,890 A | 8/1986 | Huppee | | |
| 5,052,643 A * | 10/1991 | Law | | 248/56 |
| 5,113,717 A * | 5/1992 | Plamper | | 74/502.6 |
| 5,333,917 A * | 8/1994 | Davey et al. | | 285/205 |
| 5,360,188 A * | 11/1994 | Condon | | 248/56 |
| 5,542,712 A | 8/1996 | Klinger et al. | | |
| 5,782,090 A * | 7/1998 | Locke | | 60/397 |
| 5,810,854 A * | 9/1998 | Beach | | 606/151 |
| 5,893,590 A | 4/1999 | Klinger et al. | | |
| 5,921,510 A * | 7/1999 | Benoit et al. | | 248/71 |
| 6,669,150 B2 * | 12/2003 | Benoit et al. | | 248/74.2 |
| 7,770,852 B2 * | 8/2010 | Caveney | | 248/68.1 |
| 2003/0075648 A1 * | 4/2003 | Schmidtke | | 248/74.1 |
| 2005/0242247 A1 * | 11/2005 | Geiger | | 248/74.3 |
| 2007/0063111 A1 * | 3/2007 | Alloway et al. | | 248/71 |

* cited by examiner

*Primary Examiner* — Terrell McKinnon
*Assistant Examiner* — Michael McDuffie

(57) ABSTRACT

A grommet is disclosed which couples with a component under a hood of an automobile. The grommet has an insertion end with four wipers, a body, and a retaining loop opposite the insertion end. The wipers are generally triangular in cross-section with a distal tip of the triangle sweeping toward the body so that when the grommet couples with an orifice in the component by pressing the insertion end into the orifice, the wipers deform, but resist insertion. Due to the angle of the wipers, the wipers resist decoupling of the grommet from the component. The retaining loop defines an opening through which a tube, pipe, and/or wires are placed and secured with a bolt that engages threads of a bolt hole in the body.

3 Claims, 1 Drawing Sheet

GROMMET

BACKGROUND

1. Technical Field

The present disclosure relates to grommets, particularly for automotive applications.

2. Background Art

Packaging components under the hood of an automobile presents a challenge. It is useful to provide retainers associated with existing components so that additional single-purpose retainers are obviated. For example, it is known to install a grommet into an air box with the grommet having a retention feature to retain an air tube, a portion of a wiring harness, or other element. Such a grommet is coupled with the air box, or other under-hood component, by a manual insertion process. The insertion end of the grommet should provide a seal, while not presenting too great a resistance to insertion.

SUMMARY

An assembly is disclosed which includes an under-hood component having an orifice, a grommet having an insertion end and a retaining loop, and a retained element secured in the retaining loop. The insertion end has a plurality of wipers and the insertion end is inserted in the orifice. The under-hood component is one of an air box, an intake manifold, an air filter box, and a valve cover and the retained element is one of a tube, a pipe, and a plurality of wires. The grommet has a body having a retention feature and an insertion end on which the plurality of wipers is disposed. The wipers are generally triangular in cross-section with a distal tip of the triangle sweeping toward the body. In one embodiment, the retention feature of the grommet is a retaining loop having an end capable of being deformed to provide access to an opening defined in the retaining loop. The body of the grommet has a bolt hole, the end of the retaining loop has a through hole, and the bolt hole aligns with the through hole when the retaining loop of the grommet is undeformed. In some embodiment, the grommet further includes a ledge on the body with the ledge having a greater cross-sectional area than a cross-sectional area of the insertion end. The ledge prevents insertion of the grommet beyond the insertion end. The wipers have tips extending outwardly from the insertion end, the tips of the wipers define a major diameter and a base of the wipers located at a minor diameter, and an orifice into which the wipers cooperates has a diameter between the minor and major diameters. The grommet is comprised of a flexible, polymeric material and the component is comprised of one of a polymeric and a metallic material.

The grommet has a body with a retention feature and an insertion end having at least three of wipers. The wipers are generally triangular in cross-section with a distal tip sweeping toward the body. The retention feature is a retaining loop having an end capable of being folded back to provide access to an opening defined in the retaining loop. The body of the grommet has a bolt hole, the end of the retaining loop has a through hole, and the bolt hole aligns with the through hole when the retaining loop is undeformed. The grommet may include a ledge on the body, with the ledge having a greater cross-sectional area than a cross-sectional area of the insertion end. The ledge prevents insertion of the grommet into an orifice of a particular diameter beyond the insertion end. The wipers have tips extending outwardly from the insertion end. The tips of the wipers define a major diameter. A base of the wipers is located at a minor diameter. An orifice with which the wipers cooperate has a diameter between the minor and major diameters.

A method to secure a line to a component includes opening a retaining loop of a grommet, inserting the line into an opening of the retaining loop, closing the retaining loop, and inserting the insertion end of the grommet into an orifice in the component.

Additionally, a bolt is engaged through the through hole and with threads in the bolt hole. The grommet is comprised of a flexible material; tips of wipers extend outwardly from the grommet define a major diameter; a base of the wipers define a minor diameter; the orifice of the component has a predetermined diameter; the predetermined diameter is greater than the minor diameter; and the predetermined diameter is less than the major diameter.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to a grommet for an air box to secure an air tube. However, those of ordinary skill in the art may recognize similar applications or implementations with other engine/vehicle components to which other lines, such as a portion of a wiring harness, are to be secured or retained.

Figure 1:
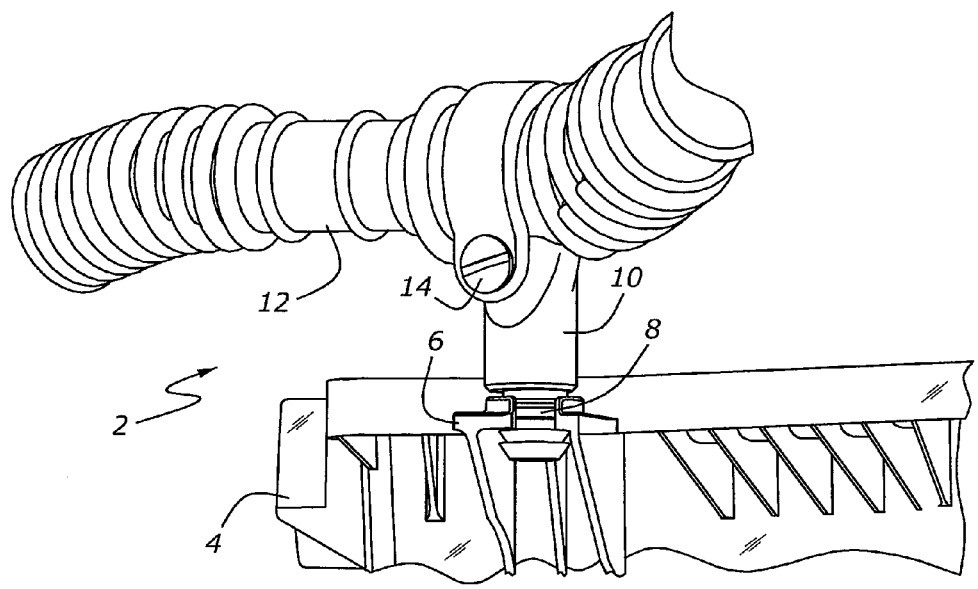
FIG. 1 is an illustration of an air box with a grommet installed.

In FIG. 1, an air box assembly 2, according to one embodiment, is shown, which includes an air box 4, which has a support feature 6 which has a portion of an orifice 8 defined therein. A grommet 10 couples with orifice 8 of air box 4. An air tube 12 couples with a retaining feature of grommet 10, the retaining feature securing air tube 12 with a bolt 14. Alternatively, instead of a portion of an orifice, the grommet is inserted into an orifice that contacts the grommet on its full circumference.

Figure 2:
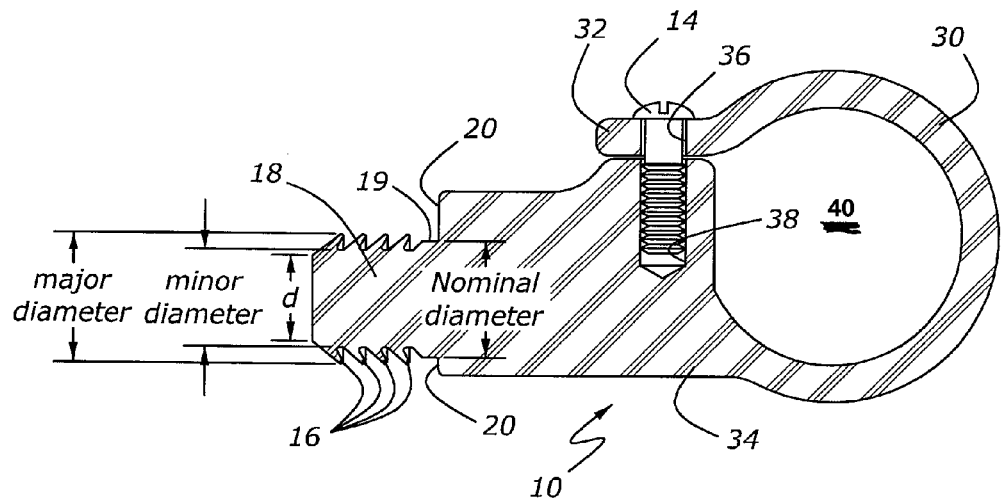
FIG. 2 is cross-section of the grommet according to an embodiment of the disclosure.

In FIG. 2, grommet 10 has multiple wipers 16, which deform during the insertion of grommet 10 into orifice 8 of air box 4. An insertion end 18 of grommet 10 has minor and major diameters facilitating insertion. A diameter of the tip of insertion end 18 is slightly smaller than the minor diameter to assist in locating insertion end 18 onto the orifice into which it is to be inserted. Grommet 10 has a ledge 20, which limits the insertion depth of grommet 10 into the orifice. In the embodiment shown in FIG. 2, insertion end 18 has a short length 19 between wipers 16 and ledge 20 of a constant, nominal diameter, which is a diameter that is approximately equal to, or just smaller than, the orifice diameter. Grommet 10 is formed of a flexible material such that wipers 16 are deformed, when inserted into the orifice of air box 12. Due to the orientation of wipers 16, i.e., that the tips of the triangular cross section of wipers 16 sweep away from insertion end 18, the wipers 16 can be deformed to facilitate insertion, but resist removal. The deformation of wipers 16 is much greater in the removal direction than in the insertion direction. In the embodiment shown in FIG. 1, grommet 10 is installed into support feature 6 of air box 4, which is wholly external to air box 4. However, in an alternative embodiment, an orifice may be provided in the air box, or other component in such a manner as to provide fluid communication between the interior of the box and atmosphere. In such an embodiment, wipers 16 are used to provide a sealing force acting upon the orifice. In the embodiment shown in FIG. 1, only two of four wipers are deformed after the installation has been completed. In the embodiment in which the orifice passes through the component, a longer or shorter orifice may be used so that the number of wipers providing the sealing and retention is optimized to provide the desired sealing and retention characteristics.

Referring to FIG. 2, grommet 10 has a retaining loop 30. An end 32 of retaining loop 30 overlaps a body 34 of the grommet 10 with a through hole 36 through end 32 of retaining loop 30 aligning with a bolt hole 38 in body 34. In one embodiment, bolt hole 38 is threaded. Because grommet 10 is flexible, end 32 can be bent away from body 34 to allow a tube or wires to be placed in an opening 40 defined by retaining loop 30. Once the tube or wires are situation in opening 40, end 32 is allowed to spring back into position and a fastener (e.g., a bolt) installed into holes 36, 38. In such a manner, the tube or wires can be secured in place thereby avoiding pinching or pulling if caught in rotating components or melting due to draping over components that may get hot.

Wipers 16 are generally triangular in cross section with a tip of wipers 16 extending outwardly from grommet 10. Wipers 16 extend in a direction toward body 34 such that the tip of a particular wiper is closer to body 34 than the base (where the wiper couples with the insertion tip) of the particular wiper. This geometry aids in reducing the insertion force and resisting removal.

Referring to FIG. 1, support feature 6 shows two distal wipers of grommet 10 are undeformed in the installed state and the two proximate wipers of grommet 10 are deformed. In some embodiments, orifice 8 couples with grommet 10 over the entire circumference. In alternative embodiments, orifice 8 couples with grommet 10 over less than the full circumference, but more than half. It may be useful, in some tight packaging circumstances, for support feature 6 to extend a lesser distance from air box 4 than if coupling over the full circumference.

While the best mode has been described in detail, those familiar with the art will recognize various alternative designs and embodiments within the scope of the following claims.

Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate assessment of the state of vehicle accessories. However, to maintain a desirable cost structure, a satisfactory estimation of some accessory quantities may be ascertained by inferring from a lesser set of sensor data. The embodiments described as being less desirable relative to other embodiments with respect to one or more characteristics are not outside the scope of the disclosure as claimed.

What is claimed:

1. A grommet, comprising:
   an insertion section disposed along a axis and having a proximal end and a distal end, the distal end having a diameter smaller than a diameter of the proximal end;
   a retaining loop; and
   a ledge section having:
      a distal end terminating at the insertion section; and
      a proximal end spaced from the distal end of the ledge section, a first side of the proximal end of the ledge section termination in one end of the retaining loop;
   a fastener disposed along an axis perpendicular to the axis of the insertion section for fastening an opposite end of the retaining loop to side of the ledge section opposite said first side of the distal end of the ledge section;
   wherein the distal end of the ledge section has a cross sectional area greater than the cross sectional area of the proximal end of the insertion section; and
   wherein said opposite end on the retaining loop has an aperture therein;
   wherein the second side of the distal end of the ledge section has an aperture therein; and
   wherein the fastener passes through the aperture in the retaining loop and into the aperture of the ledge section.

2. The grommet recited in claim 1 the inertion section has wipers and wherein the wipers are generally triangular in cross-section with a distal tip of the triangle sweeping toward the body.

3. The grommet recited in claim 1 wherein the retaining loop is deformable.

* * * * *